US007524229B2

(12) United States Patent
Tokai et al.

(10) Patent No.: US 7,524,229 B2

(45) Date of Patent: Apr. 28, 2009

(54) MANUFACTURING METHOD OF GAS DISCHARGE TUBE, GAS DISCHARGE TUBE, AND DISPLAY DEVICE

(75) Inventors: Akira Tokai, Kawasaki (JP); Hitoshi Yamada, Kawasaki (JP); Kenji Awamoto, Kawasaki (JP)

(73) Assignee: Shinoda Plasma Corporation, Hyogo (JP)

( * ) Notice: Subject to any disclaimer, the term of this patent is extended or adjusted under 35 U.S.C. 154(b) by 660 days.

(21) Appl. No.: 11/092,595

(22) Filed: Mar. 29, 2005

(65) Prior Publication Data

US 2006/0119247 A1 Jun. 8, 2006

(30) Foreign Application Priority Data

Dec. 3, 2004 (JP) ............................ 2004-351784

(51) Int. Cl.
*H01J 9/26* (2006.01)
*C03B 23/20* (2006.01)

(52) U.S. Cl. ........................... 445/43; 445/26; 313/624; 65/36; 65/56

(58) Field of Classification Search ................... 445/22, 445/23, 26, 27, 43; 313/624; 65/36, 43, 65/56

See application file for complete search history.

(56) References Cited

U.S. PATENT DOCUMENTS 4,354,717 A * 10/1982 Rech et al. .................... 445/28
5,155,463 A * 10/1992 Ueda .......................... 337/112
2004/0083761 A1* 5/2004 Cooper et al. .................. 65/34
2004/0152389 A1 8/2004 Tokai et al.
2005/0017644 A1* 1/2005 Ono et al. ................... 313/633

FOREIGN PATENT DOCUMENTS

JP 2003-203603 7/2003

OTHER PUBLICATIONS

Chinese Patent Office Action, mailed Aug. 29, 2008 and issued in corresponding Chinese Patent Application No. 200510062850.5.

* cited by examiner

*Primary Examiner*—Karabi Guharay
(74) *Attorney, Agent, or Firm*—Staas & Halsey LLP

(57) ABSTRACT

A method of manufacturing a gas discharge tube by closing an opening of a glass tube by forming a glass layer with outer peripheral shape identical to the outer peripheral shape of the glass tube on an end face of the glass tube. An open end face (opening) of the glass tube is pressure-welded to a dry film containing a low melting point glass powder and a binder resin, and then the glass tube is lifted up to transfer the dry film for closing the opening to the end face of the glass tube. A phosphor support member is inserted into the glass tube from a side opposite to the end face and then an end of the phosphor support member is caused to adhere to the dry film. The binder resin is burnt off, and the dry film is vitrified to produce a low melting point glass layer.

15 Claims, 8 Drawing Sheets

MANUFACTURING METHOD OF GAS DISCHARGE TUBE, GAS DISCHARGE TUBE, AND DISPLAY DEVICE

CROSS-REFERENCE TO RELATED APPLICATION

This non-provisional application claims priority under 35 U.S.C. §119(a) on patent application No. 2004-351784 filed in Japan on Dec. 3, 2004, the entire contents of which are hereby incorporated by reference.

BACKGROUND OF THE INVENTION

The present invention relates to a gas discharge tube in which a discharge gas is sealed, a manufacturing method of the gas discharge tube, and a display device which can display images (video images) such as moving images by arranging a large number of gas discharge tubes.

A large display device, which can display video images such as moving images by, for example, arranging a large number of gas discharge tubes, each of which is produced by providing a phosphor layer inside a thin glass tube with an external diameter of 1 mmϕ and a thickness of 0.1 mm and sealing a discharge gas therein similarly to the light-emitting principle of PDP, is proposed. Since this display device is a self emission type display device, it is possible to display bright video images and realize a large screen more than 100 inches. Thus, this display device is suitable for applications where the entire surface of an indoor wall is made a display device.

By the way, for such a display device, it is necessary to use thin, long gas discharge tubes according to the size of the display screen. However, in order to manufacture gas discharge tubes longer than 1 m, such as 2 m- to 3 m-long gas discharge tubes, the manufacturing machine becomes larger and the manufacturing cost increases, and also there is a problem that it is extremely difficult to manufacture uniform and satisfactory gas discharge tubes. More specifically, in order to manufacture a gas discharge tube, it is necessary to form a secondary electron emitting film of magnesium oxide (MgO), etc. and a phosphor layer therein. However, a sintering process is necessary to form these secondary electron emitting film and phosphor layer, and therefore if a length in the tube axial direction increases, it becomes extremely difficult to form the secondary electron emitting film and phosphor layer in good condition inside the gas discharge tube. The reason for this is that if the gas discharge tube becomes longer, there will be a shortage of oxygen in the tube, necessary for decomposing organic components such as a resin, and consequently it will be difficult to form a uniform film.

Hence, a proposal is made to provide a display device 100 capable of realizing the display screen of desired size even when gas discharge tubes shorter than the length of one side of a display screen are used, by regularly arranging a plurality of gas discharge tubes of different emission colors, namely, red (R) gas discharge tubes 100*a*, green (G) gas discharge tubes 100*b* and blue (B) gas discharge tubes 100*c*, in a line direction X of the screen and arranging a plurality of gas discharge tubes of the same emission color, for example, red gas discharge tubes 100*a* and 100*a*, in a column (tube axial direction) Y of the screen as shown in FIG. 1. For such a display device 100, since short gas discharge tubes can be used, it is possible to form the secondary electron emitting film and phosphor layer uniformly in good condition inside the tubes.

However, in the case where a plurality of gas discharge tubes are arranged in the tube axial direction, the contact section between adjacent gas discharge tubes in the tube axial direction becomes a non-light-emitting region 110 where a discharge cell cannot be formed. It is therefore necessary to dispose a pair of sustain electrodes 130*a* and 130*b* so as to prevent a discharge cell 120 from being included in the non-light-emitting region 110.

By the way, main elements that specify the display quality of the display device include brightness and resolution. The brightness is determined by the occupancy of the discharge cells 120 (X1/(X1+X2))×(Y1/(Y1+Y2)), the resolution in the column direction of the screen is determined by the pitch length (X1+X2) of the gas discharge tubes, and the resolution in the line direction of the screen is determined by the pitch length (Y1+Y2) of the sustain electrodes. Here, X2 is an element concerning the thickness of the gas discharge tube, and determined by the gas discharge tube to be placed. Hence, in order to achieve a high-brightness, high-resolution display device, it is necessary to shorten Y2, that is, it is necessary to narrow the non-light-emitting region 110.

However, the end faces of conventional gas discharge tubes are semi-spherical as shown in FIG. 1 and have irregularity in shape because the gas discharge tubes are sealed by heating the ends of glass tubes, and therefore it is extremely difficult to make the non-light-emitting region 110 uniform over the entire surface of the display screen. Consequently, it is difficult to make the brightness of all the discharge cells uniform, and there is a possibility that the conventional display device may have uneven brightness.

Therefore, the present inventor et., al. proposed a display device which uses gas discharge tubes with flat end faces to decrease the volume of the contact section between the facing gas discharge tubes, thereby capable of ensuring a sufficient display area (see, for example, Japanese Patent Application Laid-Open No. 2003-203603). A gas discharge tube disclosed in the Japanese Patent Application Laid-Open No. 2003-203603 is obtained by placing a thin glass plate with an adhesive layer in contact with a glass tube and heating the thin glass plate with a heater or the like to adhere it to an end face of the glass tube.

BRIEF SUMMARY OF THE INVENTION

However, in order to manufacture the above-mentioned gas discharge tube, a thin glass plate with a shape identical to the shape of an end face of the glass tube must be prepared in advance, and it is necessary to fabricate a thin glass plate in a shape identical to a supposed end face shape in advance. If there is an irregularity in the end face shapes of glass tubes, it is necessary to prepare a plurality of thin glass plates, and it is also necessary to measure the end face shape of a glass tube and select any one of the thin glass plates for use. Since such problems are present, consequently the thin glass plate 102 may become larger than the glass tube 101 as shown in FIG. 2A, or the thin glass plate 102 may become smaller than the glass tube 101 as shown in FIG. 2B. Further, when bringing the glass tube and thin glass plate into contact with each other, the thin glass plate 102 and glass tube 101 may not be aligned properly as shown in FIG. 3.

In the cases of FIG. 2B and FIG. 3, since the area of the contact between the thin glass plate 102 and glass tube 101 is reduced, cracks will occur easily, and there is a possibility that the discharge gas sealed in the glass tube 101 may leak out through the cracks.

On the other hand, in the case of FIG. 2A, since the thin glass plate 102 is larger than the outer peripheral shape of the glass tube 101, if a large number of gas discharge tubes are arranged in parallel, as shown in FIG. 4, the thin glass plates 102 come into contact with each other, and a gap 140 is produced between the gas discharge tubes arranged substantially orthogonal to the tube axial direction. Consequently, X3>X2 (see FIG. 1 for X2), the parameter (X1/(X1+X3)) of the discharge cell 120 that determines the brightness decreases and the pitch length (X1+X3) of the gas discharge tubes that determines the resolution in the line direction of the screen becomes longer. Consequently, there is a problem that the brightness and resolution of the display device decrease (the same can also be said for the case of FIG. 3).

The present invention has been made with the aim of solving the above problems, and it is an object of the present invention to provide a manufacturing method of a gas discharge tube having a glass layer with outer peripheral shape identical to the outer peripheral shape of a glass tube, which can closes an opening of the glass tube by forming the glass layer in a flat shape on an open end face (opening) of the glass tube by pressure-welding the end face of the glass tube to a soft material containing a glass powder and a binder resin.

Another object of the invention is to provide a manufacturing method of a gas discharge tube, which can close an opening of a glass tube by forming a glass layer in a flat shape on an open end face of the glass tube by bringing the end face of the glass tube into contact with a softened glass material.

Still another object of the invention is to provide a manufacturing method of a gas discharge tube comprising a glass tube, a glass layer having a flat shape along an axial cross section of the glass tube and formed on an open end face of the glass tube, and a phosphor support member having a phosphor layer and fixed to the glass layer, and to provide the gas discharge tube and a display device comprising a plurality of the gas discharge tubes arranged in a tube axial direction and a direction substantially orthogonal to the tube axial direction.

A manufacturing method of a gas discharge tube according to a first aspect of the invention is a method of manufacturing a gas discharge tube having a phosphor layer inside a glass tube, and comprises the steps of: pressure-welding an open end face of the glass tube to a soft material containing a glass powder and a binder resin to entirely cover the end face, cutting the soft material by a shear force caused by the pressure-welding, adhering the cut soft material to the end face of the glass tube, and forming a glass layer that closes an opening in the end face of the glass tube by sintering the soft material.

In the first aspect, an open end face of a glass tube is pressure-welded to a soft material containing a glass powder and a binder resin. Since a shear force is applied to the soft material by this pressure-welding, a crack occurs along the outer periphery of the glass tube, and the soft material is cut into two parts. Since this crack occurs in the position corresponding to the outer periphery of the glass tube, one part of the cut soft material has a shape along an axial cross section of the glass tube. Moreover, the one part of the soft material adheres to the open end face of the glass tube due to the adhesiveness of the binder resin contained in the soft material. Then, by sintering the soft material, the binder resin contained in the soft material is burnt off, and a glass layer is fixed to the end face of the glass tube and closes the opening of the glass tube.

A manufacturing method of a gas discharge tube according to a second aspect of the invention is based on the first aspect, and comprises the steps of: inserting a phosphor support member on which the phosphor layer is formed into the glass tube before sintering the soft material; adhering an end of the inserted phosphor support member to the soft material; and fixing the end of the phosphor support member to the glass layer in the step of forming the glass layer by sintering the soft material.

In the second aspect, by inserting the phosphor support member on which the phosphor layer is formed into the glass tube, an end of the phosphor support member adheres and is fixed to the soft material due to the adhesiveness of the binder resin contained in the soft material. Consequently, since the phosphor support member and the glass tube will not rub against each other, there is no possibility of occurrence of glass chips.

A manufacturing method of a gas discharge tube according to a third aspect of the invention is based on the first or second aspect, and characterized in that the soft material is formed on a support body, and the soft material is separated from the support body after entirely covering the end face of the glass tube with the soft material.

In the third aspect, the soft material is formed on a support body made of glass or a resin film, and the soft material is separated from the support body after entirely covering the end face of the glass tube with the soft material. Since it is only necessary to place the soft material on the support body, it is extremely easy to control the thickness of the soft material, and it is possible to highly accurately control the thickness of the glass layer to be formed on the end face of the gas discharge tube.

A manufacturing method of a gas discharge tube according to a fourth aspect of the invention is based on the third aspect, and characterized in that an adhesive strength between the support body and the soft material is smaller than an adhesive strength between the glass tube and the soft material.

In the fourth aspect, since the adhesive strength between the support body and soft material is smaller than the adhesive strength between the glass tube and soft material, the soft material is stably separated from the support body, and a glass layer having a shape along an axial cross section of the glass tube is formed on the glass tube irrespective of the shape of the axial cross section.

A manufacturing method of a gas discharge tube according to a fifth aspect of the invention is based on the third or fourth aspect, and characterized in that the soft material is obtained by evaporating an organic solvent from a paste material containing the glass powder, the binder resin and the organic solvent.

In the fifth aspect, the method uses a soft material obtained by evaporating an organic solvent from a paste material containing the glass powder, the binder resin and the organic solvent. By adding an appropriate amount of an organic solvent to improve the fluidity of a paste material, it is possible to adjust the printing characteristics, for example, when forming the soft material on the support body by using a printing technique.

A manufacturing method of a gas discharge tube according to a sixth aspect of the invention is based on the fifth aspect, and characterized in that the paste material further contains inorganic component filler.

In the sixth aspect, by adding an appropriate amount of inorganic filler into the paste material, it is possible to reduce the fluidity of the paste material.

A manufacturing method of a gas discharge tube according to a seventh aspect of the invention is a method of manufacturing a gas discharge tube having a phosphor layer inside a glass tube, and comprises the steps of: softening a glass material and bringing the softened glass material into contact with an open end face of the glass tube; and forming a glass layer that closes an opening in the end face of the glass tube by hardening the glass material.

In the seventh aspect, a glass material is softened, and the softened glass material is brought into contact with an open end face of a glass tube. With this contact, the softened glass material is fused to the open end face of the glass tube. Then, by hardening the glass material, a glass layer is fixed to the end face of the glass tube, and the opening of the glass tube is closed.

A gas discharge tube according to an eighth aspect of the invention is a gas discharge tube having a phosphor layer inside a glass tube, and characterized in that a glass layer having a flat shape along an axial cross section of the glass tube is provided on an end face of the glass tube, and an end of a phosphor support member on which the phosphor layer is formed is fixed to the glass layer.

In the eighth aspect, a glass layer having a flat shape along an axial cross section of a glass tube is provided on an end face of the glass tube, and an end of a phosphor support member on which a phosphor layer is formed is fixed to the glass layer. Therefore, there is no possibility that the phosphor support member and the glass layer will rub against each other and cause glass chips. Moreover, since the position of the phosphor support member in the glass tube is fixed, the brightness of the gas discharge tube is stable.

A gas discharge tube according to a ninth aspect of the invention is based on the eighth aspect, and characterized in that a linear expansion coefficient of the glass layer is substantially equal to a linear expansion coefficient of the glass tube.

In the ninth aspect, since the linear expansion coefficient of the glass layer provided on an end face of the glass tube and that of the glass tube are substantially equal, the stress caused by the difference in the linear expansion coefficient is small. It is therefore possible to reduce occurrence of cracks in the vicinity of the boundary between the glass layer and the glass tube and prevent leakage of discharge gas, and consequently the light-emission of the gas discharge tube is stable.

A display device according to a tenth aspect of the invention is a display device comprising a plurality of gas discharge tubes arranged in a tube axial direction and a direction substantially orthogonal to the tube axial direction, each of the gas discharge tubes having a phosphor layer inside a glass tube, and characterized in that each of the gas discharge tubes has a glass layer with a flat shape along an axial cross section of the glass tube on an end face thereof, adjacent gas discharge tubes in the tube axial direction of the gas discharge tube are arranged so that their glass layers are in contact with each other, and an end of a phosphor support member on which the phosphor layer is formed is fixed to the glass layer.

In the tenth aspect, a glass layer having a flat shape along an axial cross section of a glass tube is provided on an end face of each glass tube, and an end of a phosphor support member on which a phosphor layer is formed is fixed to the glass layer. Therefore, there is no possibility that the phosphor support member and the glass layer will rub against each other and cause glass chips. Moreover, since the phosphor layer formed on the phosphor support member can be set in the same position in all gas discharge tubes, the unevenness in the brightness of the respective gas discharge tubes is reduced, thereby preventing deterioration of the display quality. Further, since adjacent gas discharge tubes in the tube axial direction of the gas discharge tube are arranged so that their glass layers are in contact with each other, the non-light-emitting region is narrowed, and the brightness and resolution of the display device are improved.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Embodiment 1 explains a manufacturing method of a gas discharge tube suitable for use in a display device in which two gas discharge tubes are arranged in a tube axial direction. In this case, if gas discharge tubes with flattened one end face are arranged so that the flattened one end faces of the respective gas discharge tubes are adjacent to each other, the non-light-emitting region will not become larger, and therefore it is not necessarily to flatten the other end face.

Figures 5A, 5B, 5C, 5D, 5E:
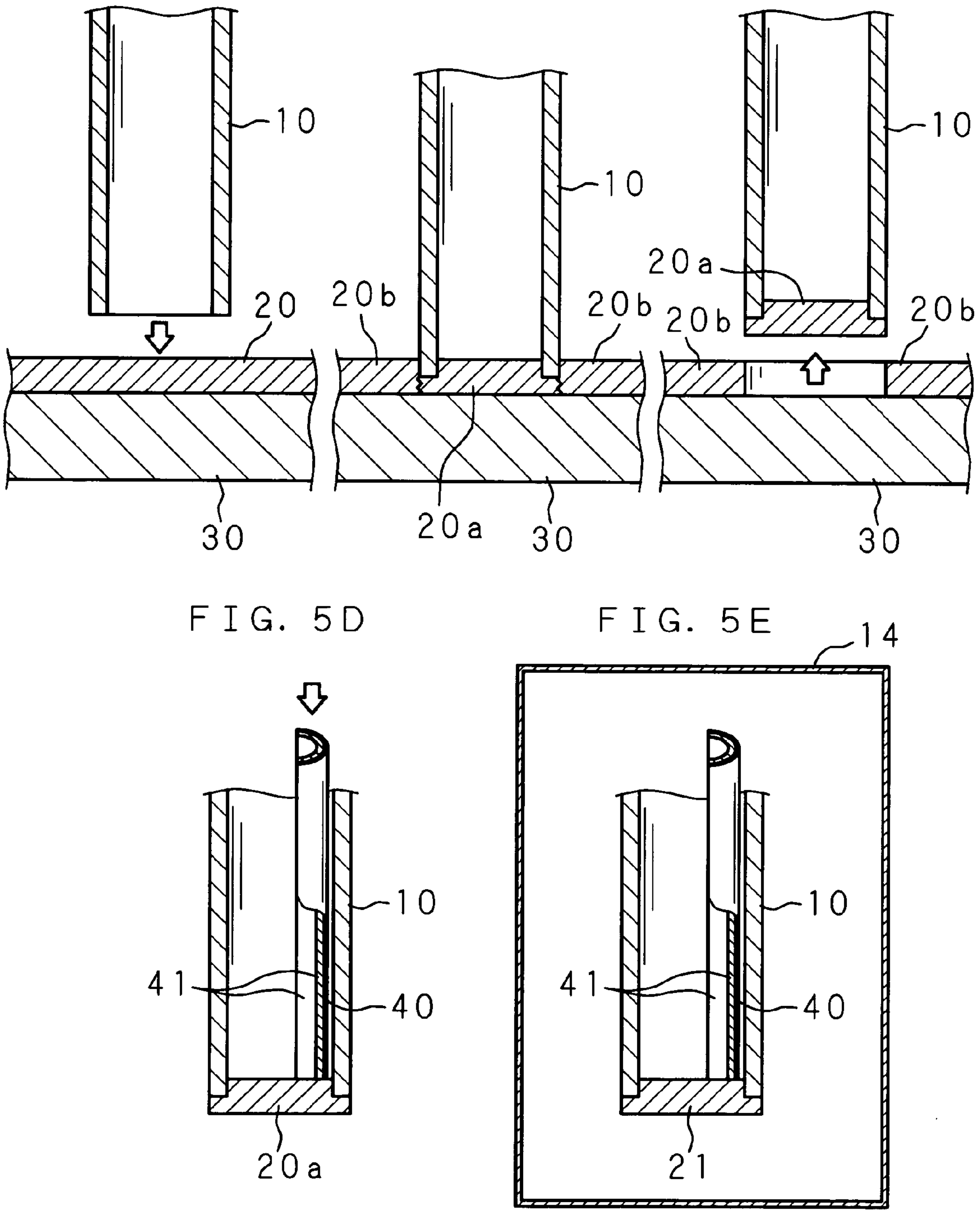
FIGS. 5A-5E are explanatory views for explaining a manufacturing method of a gas discharge tube according to Embodiment 1 of the present invention.

FIGS. 5A-5E are explanatory views for explaining a manufacturing method of a gas discharge tube according to Embodiment 1 of the present invention. Reference numeral 30 in the drawings represents a support body made of glass, a resin film or a silicone rubber sheet to which a surface release treatment is applied, and a dry film 20 containing a low melting point glass powder and a binder resin is placed on the support body 30. Reference numeral 10 in the drawings represents a glass tube with a predetermined cross sectional shape and a thickness of 0.1 mm. In this example, the cross section is substantially circular in shape, and the external diameter is 1 mmϕ and the internal diameter is 0.8 mmϕ. As the material of the glass tube 10, it is possible to use, for example, borosilicate glass, soda lime glass, etc. (FIG. 5A).

On the inner surface of the glass tube 10, a secondary electron emitting film (for example, a metal oxide film such as magnesium oxide and alumina, not shown) is formed in advance. For example, the secondary electron emitting film is formed on the inner surface of the glass tube 10 by introducing a solution containing an organic fatty acid salt (for example, fatty acid magnesium) into the glass tube 10 and sintering the solution. The second electron emitting film performs important rolls, such as preventing ion bombardment to the glass tube 10 which functions as a dielectric, and emitting secondary electrons for discharging.

The dry film 20 is prepared by printing a glass paste obtained by mixing a low melting point glass powder, a binder resin and an organic solvent together on the support body 30 using a printing technique and then evaporating the organic solvent contained in the glass paste. It is therefore easy to control the thickness of the dry film 20, and the thickness is suitably set to a desired thickness (for example, to a desired value ranging from 0.1 mm to 0.5 mm). Moreover, since the dry film 20 contains the binder resin, it has softness and adhesiveness. The organic solvent is added appropriately if the fluidity of the glass paste needs to be improved.

For example, the low melting point glass powder is the powder of $PbO—B_2O_3—ZnO$ based glass, $ZnO—P_2O_5$ based glass, etc. The binder resin is preferably a material that can be burnt off at lower temperatures than the softening temperature of the low melting point glass powder, and, for example, acrylic resin such as poly(methyl acrylate), poly (ethyl acrylate), poly(butyl acrylate) and poly(isobutyl acrylate), or methacrylic resin such as poly(methyl methacrylate), poly(ethyl methacrylate), poly(butyl methacrylate) and poly (isobutyl methacrylate). Acrylic resins and methacrylic resins can be burnt off at relatively low temperatures ranging from 300 to 450° C. Further, it may also be possible to reduce the fluidity of the paste by mixing an appropriate amount of inorganic filler into the glass paste if necessary.

In order to cause the dry film 20 to have adhesiveness, a high molecular mobility (called the rubber state) is necessary, and it is preferred to use a binder resin with a low glass transition temperature (Tg). For example, if the ambient temperature is ordinary temperature (25° C.), a binder resin with a characteristic of Tg=−60 to 20° C. is used so that the dry film 20 is in the rubber state at temperatures lower than the ambient temperature.

First, the glass tube 10 is pushed in the direction of the support body 30 (lower direction) so that the dry film 20 is pressure-welded to an end face of the glass tube 10 (FIG. 5B). At this time, the shear force caused by the end face of the glass tube 10 is applied to the dry film 20, a crack occurs in the dry film 20 along the outer periphery of the glass tube 10, and then the dry film 20 is cut into a dry film 20*a* and a dry film 20*b*.

Next, by lifting up the glass tube 10 from the support body 30, the dry film 20*a* is selectively transferred to the end face of the glass tube 10 (FIG. 5C). The transfer is made because the surface release treatment is applied to the support body 30, and an adhesive strength F1 between the dry film 20*a* and the glass tube 10 is greater than an adhesive strength F2 between the dry film 20*a* and the support body 30 (F1>F2). The dry film 20*a* has a shape along the crack produced in the dry film 20, and this crack occurs in the position corresponding to the outer periphery of the glass tube 10. Therefore, the concept of alignment accuracy does not exist. Consequently, regardless of the shape of the axial cross section of the glass tube 10, the dry film 20*a* having a shape along the axial cross section can be stably transferred to the end face of the glass tube 10.

Next, a phosphor support member 40 is inserted into the glass tube 10 from a side opposite to the end face to which the dry film 20*a* is transferred. The phosphor support member 40 is inserted until it comes into contact with the dry film 20*a* (FIG. 5D). Consequently, the phosphor support member 40 adheres (is fixed temporarily) to the dry film 20*a* due to the adhesiveness of the dry film 20*a*.

The phosphor support member 40 has an axial cross section in the shape of a crescent moon, and has a phosphor layer 41 for converting ultraviolet light generated by discharge into visible light of a predetermined color on the inner surface thereof. The phosphor layer 41 is formed by applying a phosphor material onto the phosphor support member 40 and then sintering it. Of course, the axial cross section of the phosphor support member 40 may have a substantially C shape, and the shape is not limited. However, in order to increase the surface area of the phosphor layer 41 formed on the inner surface and to improve the luminous efficiency, the shape along the inner shape of the axial cross section of the glass tube is preferred.

Further, by sintering the dry film 20*a* in a high temperature furnace at substantially 450° C., the binder resin is burnt off and the dry film 20*a* is vitrified to be a low melting point glass layer 21 (FIG. 5E). Consequently, an opening of the glass tube 10 is closed in the form of a flat face, and the phosphor support member 40 is fixed (fused) to the low melting point glass layer 21. With this method, a glass tube with one end face flattened is obtained. Note that although the above-mentioned processes are performed under atmosphere, it may also be possible to perform the processes except the sintering process in vacuum.

Next, by heating the other end face of the glass tube 10 in a chamber filled with a discharge gas such as Xe—Ne and Xe—He in the same method as the conventional example, the other end face is sealed, and the discharge gas is sealed in the glass tube 10. Thus, the gas discharge tube with one end flattened can be manufactured extremely easily at low costs. In this case, although the other end face of the glass tube 10 is not flat, the non-light-emitting region will not become larger if the flattened end faces of two glass tubes 10 are placed adjacent to each other.

Moreover, since the phosphor support member 40 is fixed to the low melting point glass layer 21, the phosphor support member 40 and the glass tube 10 will not rub against each other, and thus there is no possibility of occurrence of glass chips or damage to a secondary electron emitting film provided on the inner surface of the glass tube 10. Further, since the phosphor layer 41 formed on the phosphor support member 40 can be set in the same position in all gas discharge tubes, it is possible to reduce the unevenness in the brightness of the gas discharge tubes and prevent deterioration of the display quality.

In addition, since the concept of alignment accuracy between the glass tube 10 and dry film 20 does not exist, even when the non-sintered dry film 20 having adhesiveness is placed on one surface of the support body 30, and the flattening process is performed on a plurality of glass tubes 10 at a time by the above-described method, there is no possibility of causing irregularities in the shape, thereby realizing mass production and low costs.

By arranging a large number of such gas discharge tubes, it is possible to realize a large display device having a uniform cell pitch and high resolution. Note that if the glass tubes 10 which have therein a phosphor support member on which a phosphor layer of three colors, red, green and blue, is formed respectively, are arranged cyclically, it is possible to realize a color display.

Figure 6:
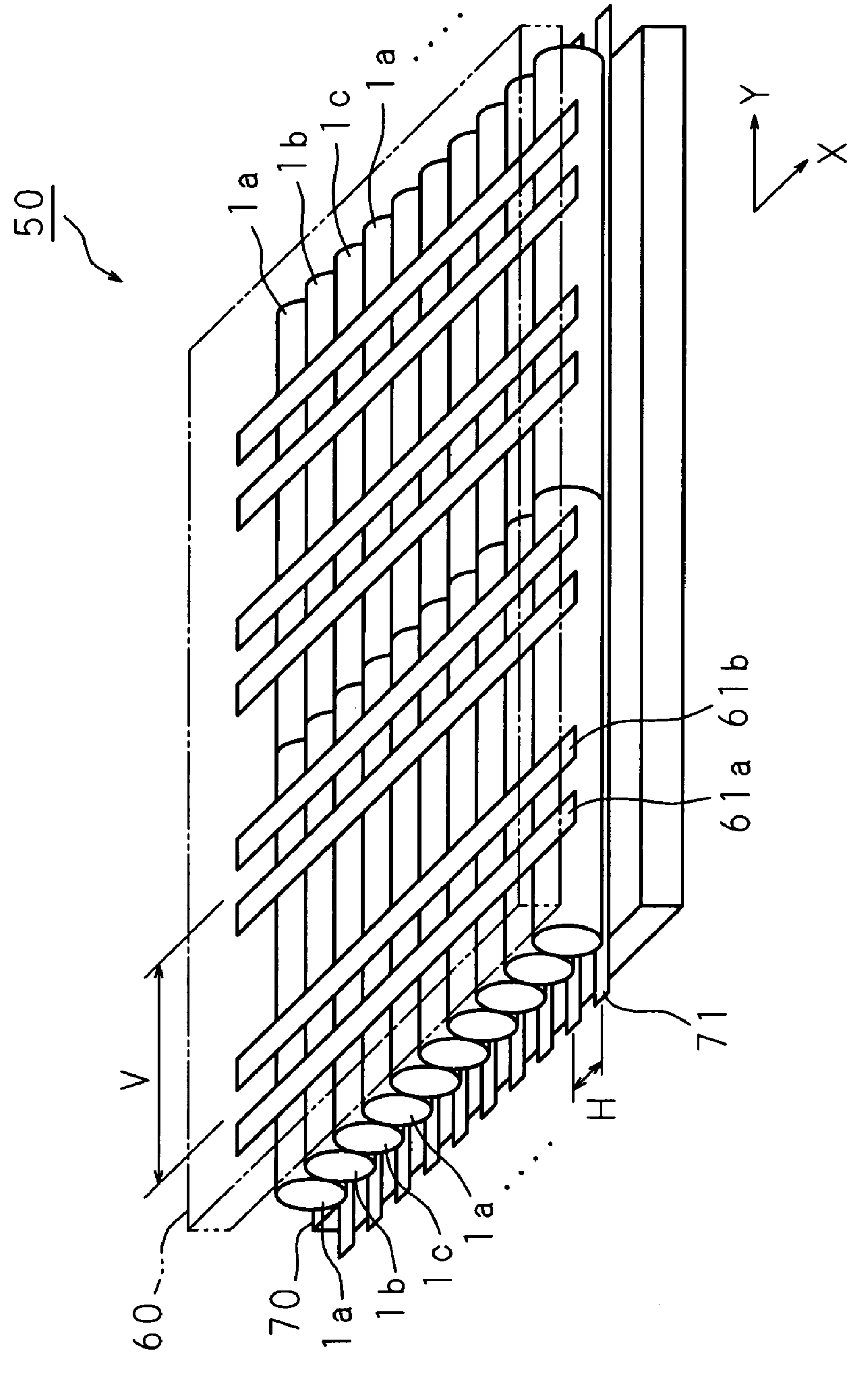
FIG. 6 is a schematic perspective view showing one example of a display device of the present invention.
Figure 7:
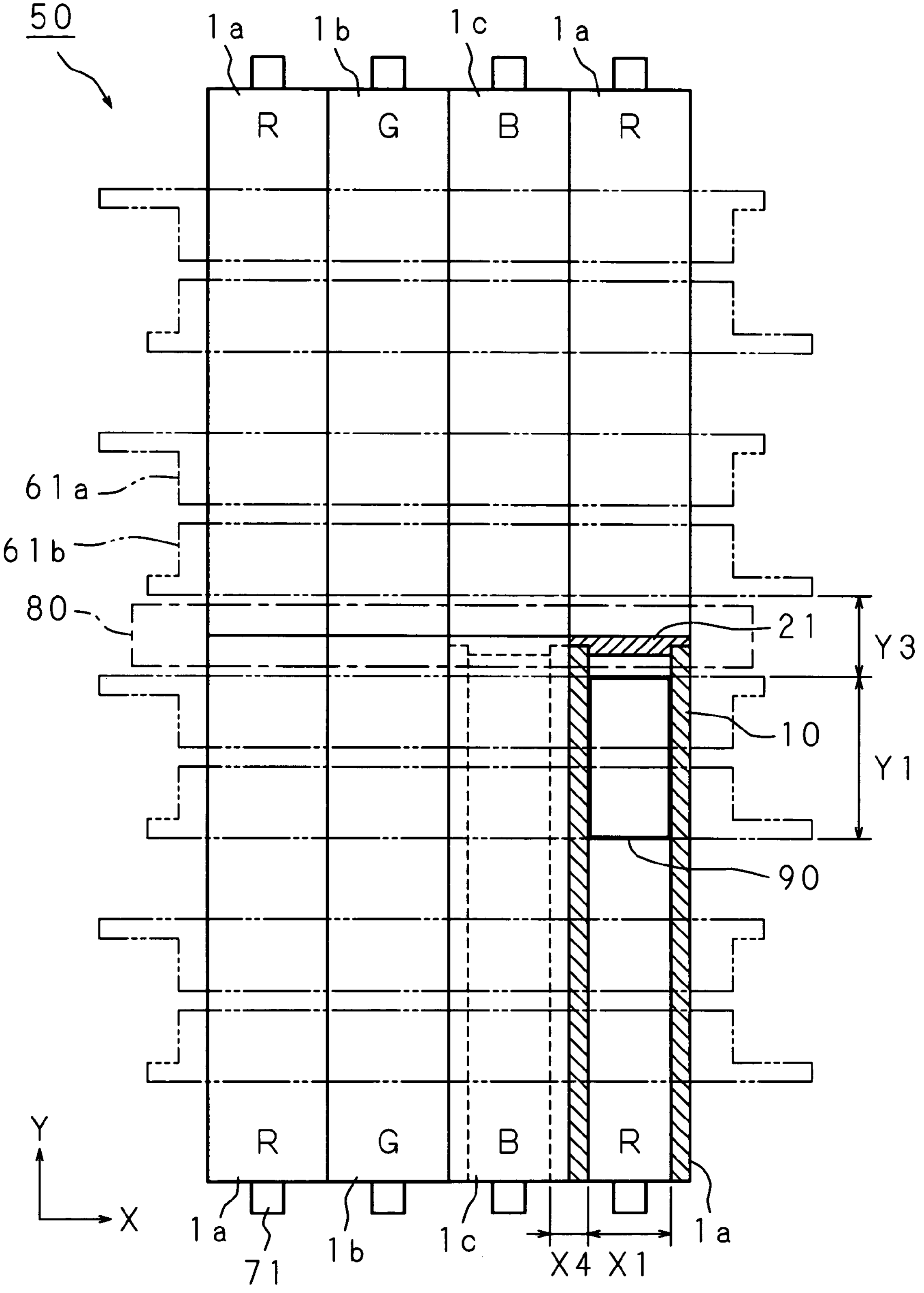
FIG. 7 is a schematic plan view showing one example of a display device of the present invention.

FIG. 6 is a schematic perspective view showing one example of a display device of the present invention, and FIG. 7 is a schematic plan view thereof A display device 50 comprises a plurality of gas discharge tubes 1*a*, 1*b*, 1*c* (hereinafter may be referred to as gas discharge tubes 1 if there is no need to distinguish them from each other) arranged between a front support body 60 and a rear support body 70 made of glass plates, flexible sheet or the like having excellent light transmittance in a visible region.

On the lower surface of the front support body 60, pairs of sustain electrodes 61*a* and 61*b* made of metal are formed at predetermined intervals V in a direction substantially orthogonal to the tube axial direction of the gas discharge tube 1. In order to efficiently emit visible light generated by discharge, the sustain electrodes 61*a* and 61*b* have mesh, ladder-like, or comb-like patterns. Modified examples of the sustain electrodes 61*a* and 61*b* include a hybrid electrode produced by combining a transparent conductive film such as ITO and a metal electrode such as Ag. On the other, on the upper surface of the rear support body 70, address electrodes 71 are formed for the respective gas discharge tubes 1, in the tube axial direction of the gas discharge tube 1 at predetermined intervals H. Since the address electrode 71 does not require light transmittance which is necessary for the sustain electrodes 61*a* and 61*b,* the shape of the address electrode 71 is not restricted, and the address electrode 71 is made of a metal film in a line pattern.

The sustain electrodes 61*a* and 61*b* and the address electrodes 71 are produced by forming an electrode material such as nickel, copper, aluminum, and silver on the front support body 60 and the rear support body 70 by a spattering technique, plating technique, etc. and then forming the electrode material into a desired pattern by a photolithography technique.

The sustain electrodes 61*a* 61*b* and the address electrodes 71 are brought into contact with and adhere to the outer surface on the upper side (front side) of the gas discharge tubes 1 and the outer surface on the lower side (rear side) during assembly. However, in order to improve the adhesion, it may be possible to interpose an adhesive between these electrodes and the gas discharge tubes and stick them together. If the front support body 60 and the rear support body 70 are made of flexible sheets such as polycarbonate films and PET (polyethylene terephthalate) films, it may be possible to arrange the flexible sheets to deform along the outer shape of the gas discharge tubes 1.

A phosphor support member (not shown) on which a red, green or blue phosphor layer is formed is inserted into each of the gas discharge tubes 1*a,* 1*b* and 1*c*. The gas discharge tubes 1*a,* 1*b* and 1*c* of different colors are arranged cyclically in a direction in which the sustain electrodes 61*a* and 61*b* extend (the line direction of the screen), and the gas discharge tubes 1*a* and 1*a* of the same color are arranged in a direction in which the address electrodes 71 extend (the column direction of the screen) so that the flattened end faces face each other.

A region partitioned by the intersecting address electrodes 71 and the sustain electrodes 61*a,* 61*b* makes a unit light emitting region (discharge cell) 90. By using either of the sustain electrodes 61*a* and 61*b* as a scanning electrode and applying a voltage between the scanning electrode and the address electrode 71, address discharge (counter discharge) for writing display data is selectively caused, and wall charge is produced on the inner wall of glass corresponding to the discharge cell. Subsequently, a voltage is applied between a pair of sustain electrodes 61*a* and 61*b* to cause display discharge (surface discharge) for retaining the display data in the discharge cell 90 in which wall charge is produced by the address discharge. The electrons produced by this discharge collide with Xe in the discharge gas, and ultraviolet light is emitted. The ultraviolet light excites the phosphor, and is converted into either red, green or blue visible light and emitted outside from the aperture section of the sustain electrodes 61*a* and 61*b*. Thus, by controlling the electric field in the discharge cell 90 by the voltage applied to the sustain electrodes 61*a,* 61*b* and the address electrodes 71 and controlling the generation of ultraviolet light, it is possible to display highly bright video images.

Figure 1:
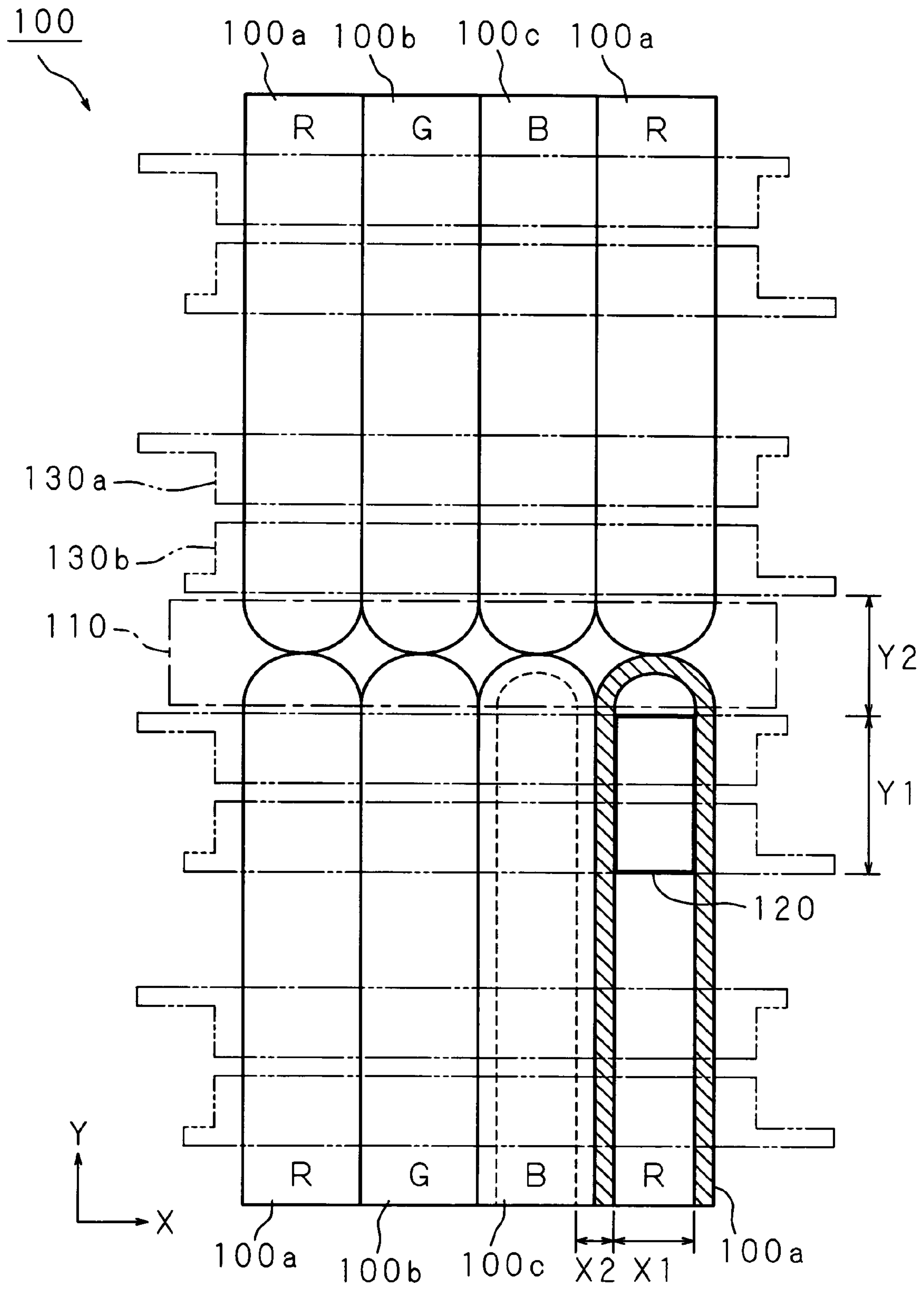
FIG. 1 PRIOR ART
FIG. 1 is a schematic plan view showing one example of a display device using conventional gas discharge tubes.
Figure 2A:
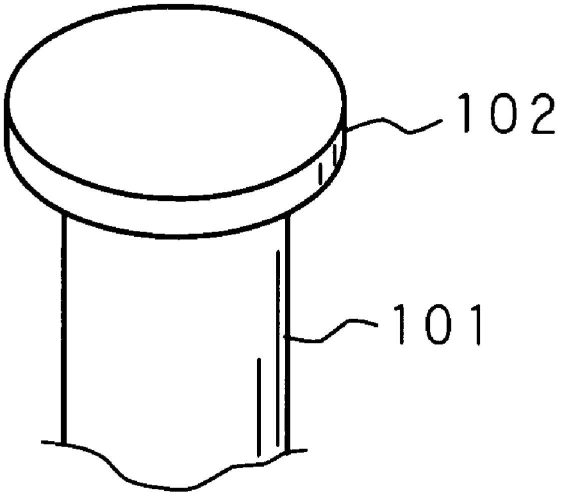
FIG. 2A PRIOR ART
FIGS. 2A and 2B are schematic perspective views showing the shape of a conventional gas discharge tube.
Figure 2B:
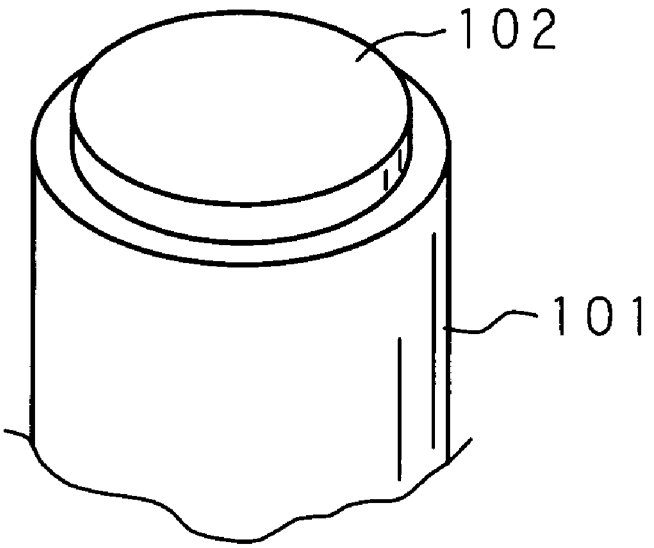
FIG. 2B PRIOR ART
Figure 3:
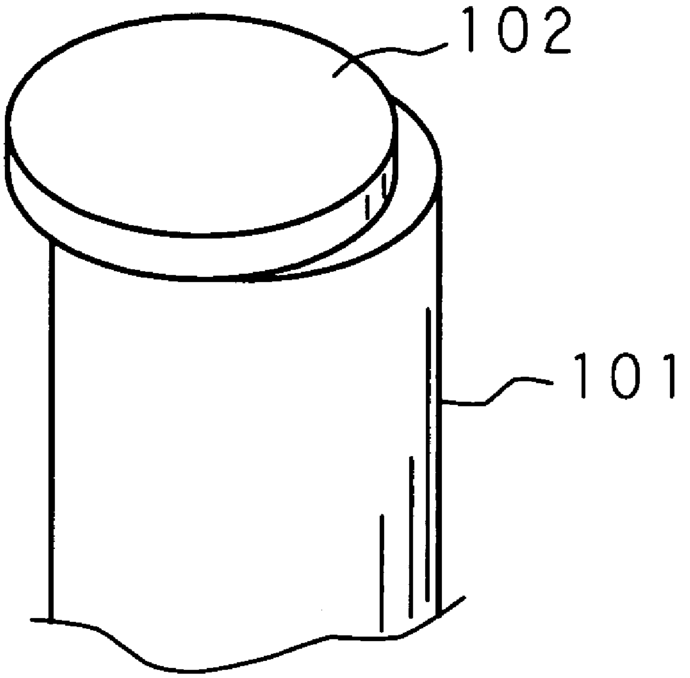
FIG. 3 PRIOR ART
FIG. 3 is a schematic perspective view showing the shape of a conventional gas discharge tube.

The thickness of the flattened end face is determined when placing the dry film 20 to be the low melting point glass layer 21 on the support body 30, and the unevenness in thickness is extremely small. In the display device 50, since the end faces with small thickness unevenness are placed adjacent to each other, Y3<Y2 (see FIG. 1 for Y2) is established, and consequently the parameter (Y1/(Y1+Y3)) of the discharge cell 90 that determines the brightness is improved, the pitch length (Y1+Y3) of the gas discharge tubes that determines the resolution in the column direction of the screen is shortened, and a non-light-emitting region 80 becomes smaller than that of the conventional example, thereby improving the display quality such as brightness and resolution.

Figure 4:
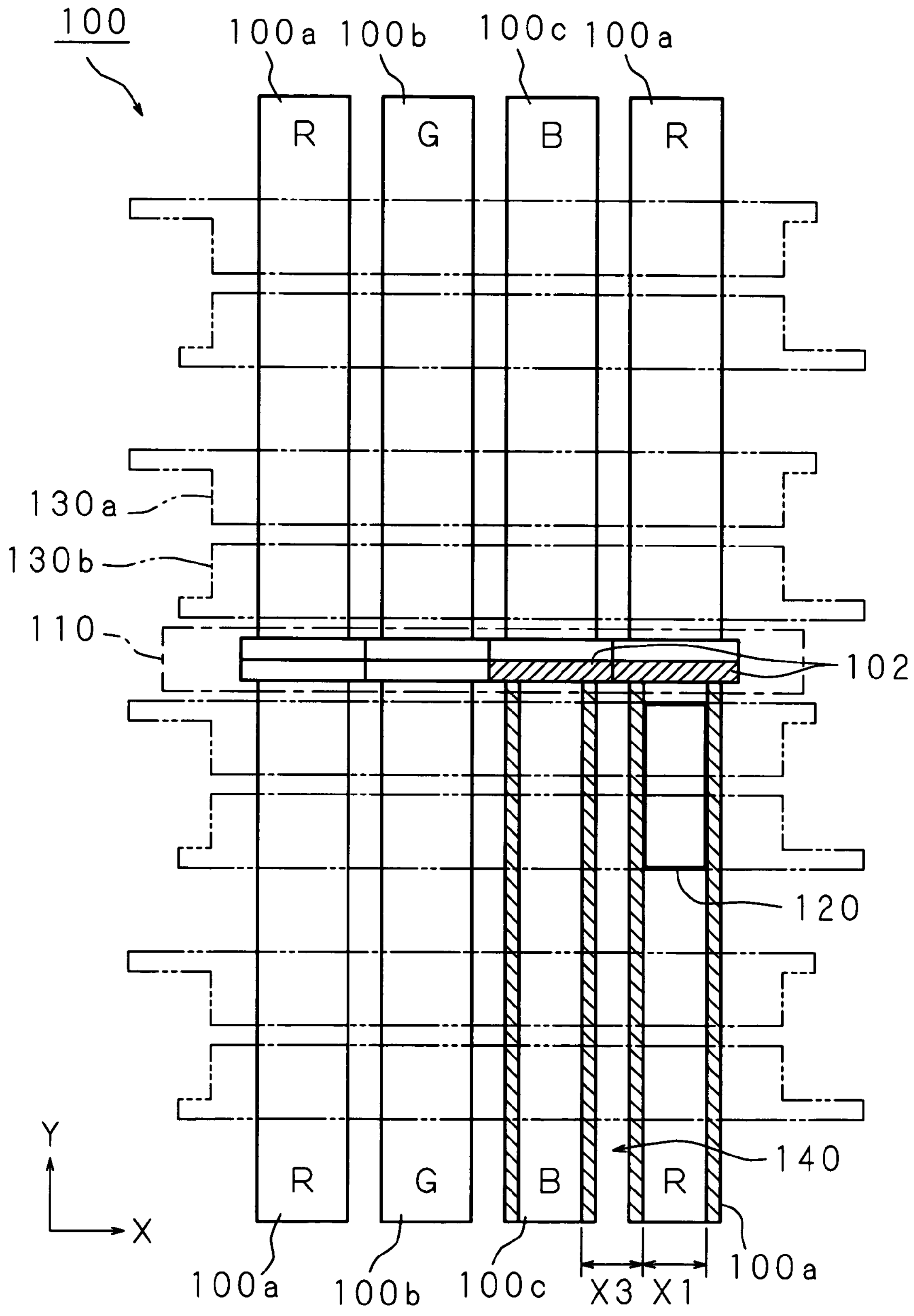
FIG. 4 PRIOR ART
FIG. 4 is a schematic plan view showing another example of a display device using conventional gas discharge tubes.

Moreover, since the outer peripheral shape of the low melting point glass layer 21 formed on the end face of the gas discharge tube 1 is identical to the outer peripheral shape of the glass tube 10, it is possible to closely arrange the gas discharge tubes in the tube axial direction of the gas discharge tube and in a direction substantially orthogonal to the tube axial direction without causing a gap between the gas discharge tubes (for example, the gas discharge tubes 1*c* and 1*a*) positioned substantially orthogonal to the tube axial direction. Consequently, X4<X3 (see FIG. 4 for X3) is established, the parameter (X1/X1+X4) of the discharge cell 90 that determines the brightness is improved, the pitch length (X1+X4) of the gas discharge tubes that determines the resolution in the line direction of the screen is shortened, and there is no possibility of decrease in the brightness and resolution

Embodiment 2

Embodiment 2 explains a manufacturing method of a gas discharge tube for use in a display device in which three or more gas discharge tubes are arranged in a tube axial direction. In this case, if one of the end faces of each of the gas discharge tubes located at both ends is flattened, similarly to Embodiment 1, the non-light-emitting region does not become larger, and therefore the other end face is not necessarily flattened, but both end faces of the other glass tubes must be flattened. Since a method for flattening one of the end faces is explained in Embodiment 1, a method for flattening the other end face will be explained below.

Figure 8A:
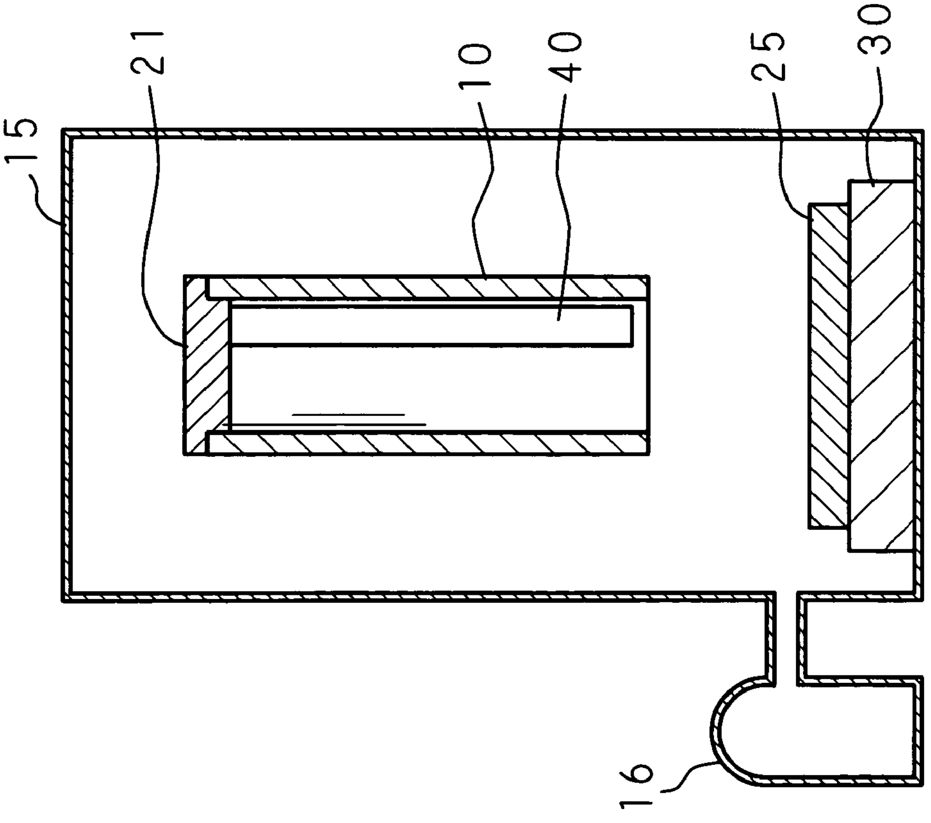
FIGS. 8A and 8B are explanatory views for explaining a manufacturing method of a gas discharge tube according to Embodiment 2 of the present invention.
Figure 8B:
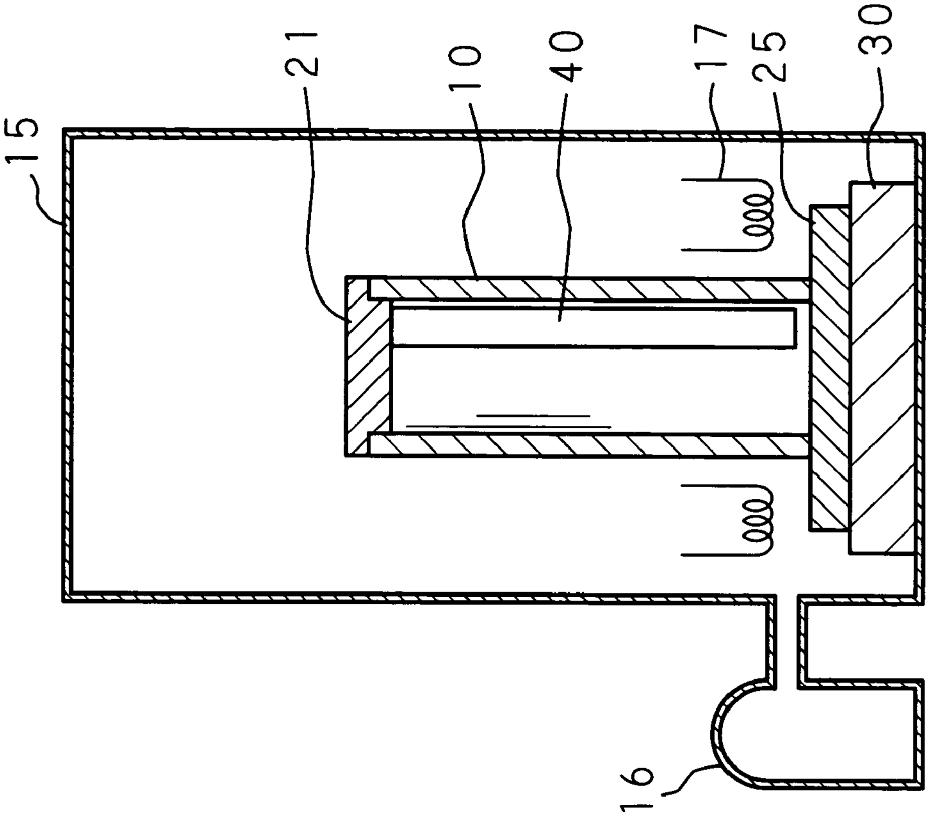

FIGS. 8A and 8B are explanatory views for explaining the manufacturing method of a gas discharge tube according to Embodiment 2 of the present invention.

First, a glass tube 10 with a low melting point glass layer 21 formed on one end face by the above-described method is mounted on a jig and placed inside a chamber 15, and then a discharge gas is introduced into the chamber 15 from a gas cylinder 16. In the chamber 15, a glass material 25 prepared by pre-sintering a dry film 20 under atmosphere to burn off the binder resin contained in the dry film 20 is placed on a support body 30 (FIG. 8A).

Next, the glass material 25 is softened by heating the glass material 25 with a heater 17 provided in the chamber 15, and brought into contact with the other end face of the glass tube 10 to fuse the glass tube 10 and the glass material 25 together (FIG. 8B). Then, after lifting up the glass tube 10 from the glass material 25, they are gradually cooled down to ordinary temperature, so that the opening of the glass tube 10 is closed to form a flat face and the discharge gas is sealed in the glass tube 10. With this method, it is possible to provide a gas discharge tube with both end faces flattened. Note that since a phosphor support member 40 has been already fixed to the low melting point glass layer 21 on the opposite side, it is not necessarily to fix the phosphor support member 40 to the glass material 25. Moreover, although the heater 17 is illustrated on the front side of the glass material 25, it may be possible to place the heater 17 under the support body 30 if it can soften the glass material 25.

By pre-sintering the glass material 25 under atmosphere (containing oxygen) in advance, the organic component contained in the dry film 20 is burnt off, and therefore no organic component is emitted even when the glass material 25 is heated in the chamber 15 into which a discharge gas is introduced. Consequently, only the desired discharge gas is sealed in the glass tube 10, without contaminating the inside of the chamber.

Thus, both openings of a glass tube can be closed to be flat faces. If this gas discharge tube is used, even when three or more gas discharges tubes are arranged in a tube axial direction, the non-light-emitting region does not become larger, and the display quality, such as brightness and resolution, is improved.

Note that although each of the embodiments uses the dry film 20, which is prepared by printing a glass paste obtained by mixing a low melting point glass powder, a binder resin and an organic solvent on the support body 30 by a printing technique and then evaporating the organic solvent contained in the glass paste by drying the glass paste, it may also be possible to use a low melting point glass sheet (called a green sheet) prepared by processing a material composed of a low melting point glass powder and a binder resin into a sheet form. The low melting point glass sheet is usually supplied in a state in which it is sandwiched between two sheets of film to which a surface release treatment is applied. Inorganic filler may be mixed into the low melting point glass sheet if necessary.

In this case, one film (film to which stronger surface release treatment is applied) on the low melting point glass sheet is separated. Then, with the same method as in FIG. 5, an end face of a glass tube is pushed against the surface of the low melting point glass sheet from which the one film is separated, the low melting point glass sheet is cut along the end face shape of the glass tube by the shear force caused by the end face of the glass tube and transferred to the end face of the glass tube by its adhesiveness.

In the case where a binder resin with high Tg is contained, after heating the dry film 20 or the low melting point glass sheet to a temperature higher than Tg to obtain adhesiveness, an end face of the glass tube is pushed against the dry film 20 or the glass sheet.

Moreover, the linear expansion coefficient of the low melting point glass layer 21 is preferably substantially equal to the linear expansion coefficient of the glass tube 10. The reason for this is that if the difference in the linear expansion coefficient is large, the stress caused in the vicinity of the boundary between the low melting point glass layer 21 and the glass tube 10 increases, and there is a possibility that cracks may occur and the discharge gas may leak.

Further, although the 3-electrode surface discharge type gas discharge tube is explained, the electrode structure is not limited, and, for example, the gas discharge tube may comprise one sustain electrode and cause address discharge and display discharge between the sustain electrode and address electrode.

According to the present invention, by pressure-welding a glass tube to a soft material containing a glass powder and a binder resin, it is possible to form a flat glass layer on an open end face of the glass tube and close the opening of the glass tube, and it is possible to extremely easily manufacture a gas discharge tube with the glass layer whose outer peripheral shape is identical to the outer peripheral shape of the glass tube at low costs.

Moreover, according to the present invention, by bringing an end face of a glass tube into contact with a softened glass material, it is possible to form a flat glass layer on the open end face of the glass tube and close the opening of the glass tube.

Further, according to the present invention, since an end of a phosphor support member on which a phosphor layer is formed is fixed to a glass layer formed on an open end face of a glass tube, there is no possibility that the phosphor support member may move in the glass tube, and thus the phosphor support member and the glass tube will not rub against each other and glass chips will not occur, or the position of the phosphor layer will not vary depending on individual gas discharge tubes, thereby reducing the unevenness in brightness and realizing a display device having excellent display quality such as brightness and resolution.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A manufacturing method of a gas discharge tube having a phosphor layer inside a glass tube, comprising:

pressure-welding an open end face of the glass tube to a soft material containing a glass powder and a binder resin to entirely cover the end face, cutting the soft material by a shear force caused by the pressure-welding, and adhering the cut soft material to the end face of the glass tube; and forming a glass layer that closes an opening in the end face of the glass tube by sintering the soft material.

2. The manufacturing method of a gas discharge tube of claim 1, further comprising:

inserting a phosphor support member on which the phosphor layer is formed into the glass tube before sintering the soft material, and adhering an end of the inserted phosphor support member to the soft material; and fixing the end of the phosphor support member to the glass layer in the step of forming the glass layer by sintering the soft material.

3. The manufacturing method of a gas discharge tube of claim 2, wherein the soft material is formed on a support body, and the soft material is separated from the support body after entirely covering the end face of the glass tube with the soft material.

4. The manufacturing method of a gas discharge tube of claim 3, wherein an adhesive strength between the support body and the soft material is smaller than an adhesive strength between the glass tube and the soft material.

5. The manufacturing method of a gas discharge tube of claim 4, wherein the soft material is obtained by evaporating an organic solvent from a paste material containing the glass powder, the binder resin and the organic solvent.

6. The manufacturing method of a gas discharge tube of claim 5, wherein the paste material further contains inorganic component filler.

7. The manufacturing method of a gas discharge tube of claim 3, wherein the soft material is obtained by evaporating an organic solvent from a paste material containing the glass powder, the binder resin and the organic solvent.

8. The manufacturing method of a gas discharge tube of claim 7, wherein the paste material further contains inorganic component filler.

9. The manufacturing method of a gas discharge tube of claim 1, wherein the soft material is formed on a support body, and the soft material is separated from the support body after entirely covering the end face of the glass tube with the soft material.

10. The manufacturing method of a gas discharge tube of claim 9, wherein an adhesive strength between the support body and the soft material is smaller than an adhesive strength between the glass tube and the soft material.

11. The manufacturing method of a gas discharge tube of claim 10, wherein the soft material is obtained by evaporating an organic solvent from a paste material containing the glass powder, the binder resin and the organic solvent.

12. The manufacturing method of a gas discharge tube of claim 11, wherein the paste material further contains inorganic component filler.

13. The manufacturing method of a gas discharge tube of claim 9, wherein the soft material is obtained by evaporating an organic solvent from a paste material containing the glass powder, the binder resin and the organic solvent.

14. The manufacturing method of a gas discharge tube of claim 13, wherein the paste material further contains inorganic component filler.

15. A manufacturing method of a gas discharge tube having a phosphor layer inside a glass tube, comprising:

pressure-welding one open end face of the glass tube to a soft material containing a glass powder and a binder resin to entirely cover the one open end face, cutting the soft material by a shear force caused by the pressure-welding, and adhering the cut soft material to the one open end face of the glass tube;

forming a glass layer that closes an opening in the one open end face of the glass tube by sintering the soft material;

softening a glass material and bringing the softened glass material into contact with the other open end face of the glass tube; and forming a glass layer that closes an opening in the other open end face of the glass tube by hardening the glass material.

* * * * *

UNITED STATES PATENT AND TRADEMARK OFFICE

CERTIFICATE OF CORRECTION

PATENT NO. : 7,524,229 B2 
APPLICATION NO. : 11/092595
DATED : April 28, 2009
INVENTOR(S) : Akira Tokai et al.

It is certified that error appears in the above-identified patent and that said Letters Patent is hereby corrected as shown below:

Title page Item [56] below
"JP 2003-203603 7/2003" insert
--CN 1550024 11/2004--.

Signed and Sealed this

Thirtieth Day of June, 2009

JOHN DOLL
*Acting Director of the United States Patent and Trademark Office*